US009796313B2

United States Patent
Toniolo et al.

(10) Patent No.: US 9,796,313 B2
(45) Date of Patent: Oct. 24, 2017

(54) FOOT-REST STRUCTURE FOR THE DRIVING SIDE OF THE FLOOR OF A MOTOR VEHICLE

(71) Applicant: FCA Italy S.p.A., Turin (IT)

(72) Inventors: Maurizio Toniolo, Turin (IT); Hamza Aribban, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 15/360,261

(22) Filed: Nov. 23, 2016

(65) Prior Publication Data
US 2017/0158105 A1 Jun. 8, 2017

(30) Foreign Application Priority Data

Dec. 3, 2015 (IT) .................. 102015000079926

(51) Int. Cl.
*B60N 3/00* (2006.01)
*B60N 3/06* (2006.01)
*B60N 3/04* (2006.01)

(52) U.S. Cl.
CPC *B60N 3/06* (2013.01); *B60N 3/04* (2013.01)

(58) Field of Classification Search
CPC B62D 25/20; B62D 25/2018; B62D 25/2036; B62D 25/2009; B62D 25/2045; B60N 3/06

(Continued)

(56) References Cited

U.S. PATENT DOCUMENTS

| 7,055,893 B2 * | 6/2006 | Yamamura | B60N 3/066 296/187.08 |
| 9,045,059 B1 | 6/2015 | Davies et al. | |
| 2002/0096904 A1 * | 7/2002 | Matsushita | B60N 3/06 296/75 |

FOREIGN PATENT DOCUMENTS

| DE | 20 2014 100395 | 3/2014 |
| EP | 2 335 973 | 6/2011 |

OTHER PUBLICATIONS

Search Report for IT UB20156235, dated Jul. 18, 2016, 2 pages.

* cited by examiner

*Primary Examiner* — Joseph D Pape
(74) *Attorney, Agent, or Firm* — Nixon & Vanderhye P.C.

(57) ABSTRACT

A foot-rest structure for the driving side of the floor of a motor vehicle comprises a foot-rest support, secured to the floor panel of the motor vehicle, a covering element mounted on the foot-rest support, and a lateral trim panel having a front edge connected to the covering element. The foot-rest support is constituted by a three-dimensional body made of plastic material, defining a three-dimensional volume projecting from the floor panel, adjacent to the lateral trim panel, and having an inclined front surface, a top surface, and at least one lateral surface, which faces the inside of the passenger compartment of the motor vehicle. The covering element is constituted by a body made of plastic material, which is arranged over the foot-rest support and has an inclined front wall arranged over the inclined front surface of the foot-rest support and defining a foot-rest surface, and a top wall and a side wall arranged over the top surface and the at least one lateral surface, respectively, of the foot-rest support. The covering element and the foot-rest support are provided with engagement elements and seats cooperating with the engagement elements for their mutual rigid connection. The front edge of the lateral trim panel is connected only to the covering element, without any direct connection to the foot-rest support. The covering element has the inclined front wall that, on a side edge thereof facing the lateral trim panel, forms a channel in which the front edge of the lateral trim panel is received, the front edge of the lateral trim panel and the channel having engagement elements and seats cooperating with the engagement ele- (Continued)

ments for rigid connection of the lateral trim panel to the covering element.

7 Claims, 6 Drawing Sheets

(58) Field of Classification Search
 USPC .......................................................... 296/75
 See application file for complete search history.

FOOT-REST STRUCTURE FOR THE DRIVING SIDE OF THE FLOOR OF A MOTOR VEHICLE

This application claims priority to IT Patent Application No. 102015000079926 filed 3 Dec. 2015, the entire contents of which is hereby incorporated by reference.

FIELD OF THE INVENTION

The present invention relates to a foot-rest structure for the driving side of the floor of a motor vehicle, of the type comprising a foot-rest support, secured to the floor panel of the motor vehicle, a covering element mounted on the foot-rest support, and a lateral trim panel having a front edge connected to the covering element.

A foot-rest structure of the type referred to above is, for example, described in EP-A-2 335 973. In this known solution, the aforesaid lateral trim panel has a front edge that engages both the aforesaid foot-rest support and the aforesaid covering element. The side panel is used to keep the coupling parts provided on the foot-rest support and on the covering element mutually engaged. This solution presents the drawback of rendering the assembly operations relatively complex, at the expense of speed of assembly and reliability of the connection.

OBJECT OF THE INVENTION

The object of the present invention is to provide a foot-rest structure of the type referred to above that is simple, presents low cost, can be assembled with easy and fast operations, and consequently provides greater assurance that the operation of assembly will be carried out properly, guaranteeing a reliable connection.

A further object lies in the simplification of the manufacturing equipment and in the possibility of guaranteeing proper assembly with not excessively stringent manufacturing tolerances.

Yet a further object lies in an increase in the space available in the area behind the foot-rest structure.

SUMMARY OF THE INVENTION

With a view to achieving the above object, the subject of the invention is a foot-rest structure of the type referred to at the beginning, further characterized in that:
  said foot-rest support is constituted by a three-dimensional body of plastic material, defining a three-dimensional volume projecting from the floor panel, adjacent to said trim lateral panel, and having a front inclined surface, an upper surface and at least one inner lateral surface facing towards the inside of the passanger compartment,
  said covering element is constituted by a body of plastic material arranged over said foot-rest support, and having:
  a front inclined wall covering said front inclined surface of the foot-rest support and defining a foot resting surface,
  an upper wall and a lateral wall respectively arranged over said upper surface and said at least one inner lateral surface of said foot-rest support,
  said covering element and said foot-rest support being provided with engagement elements and seats cooperating with said engagement elements, for their mutual rigid connection,
  the front edge of the trim lateral panel is connected only to said covering element, with no direct connections to said foot-rest support, said covering element having said front inclined wall which, on a lateral edge thereof facing the trim lateral panel, forms a channel in which the front edge of the trim lateral panel is received, said front edge of the trim lateral panel and said channel having engagement elements and seats cooperating with said engagement elements, for rigidly connecting the trim lateral panel to said covering element.

Thanks to the aforesaid characteristics, the foot-rest structure according to the invention can be assembled with relatively simple and fast operations. This also provides greater assurance that the assembly operation will be carried out properly, guaranteeing a stable and reliable connection of the aforesaid parts to one another. Moreover, the structure described is constituted by constructionally simple and low-cost parts. The impact on the manufacturing equipment is minimal, and it is possible to guarantee proper assembly with not excessively stringent manufacturing tolerances. Furthermore, thanks to the arrangement and structure described above, the space available in the area behind the foot-rest structure is increased.

In the preferred embodiment, arranged between the aforesaid covering element and the foot-rest support is a portion of a mat structure, which is mounted on the floor panel of the motor vehicle. In this embodiment, the connection between the covering element and the foot-rest support is obtained by means of a plurality of engagement elements, which project from the covering element and are designed to engage corresponding seats prearranged in the foot-rest support. In the case of the aforesaid embodiment, where the covering element is arranged over the foot-rest support with interposition of a mat portion, the engagement elements projecting from the covering element also traverse passages obtained in the mat portion, in addition to engaging the corresponding seats in the foot-rest support.

DETAILED DESCRIPTION OF AN EMBODIMENT

Figure 1:
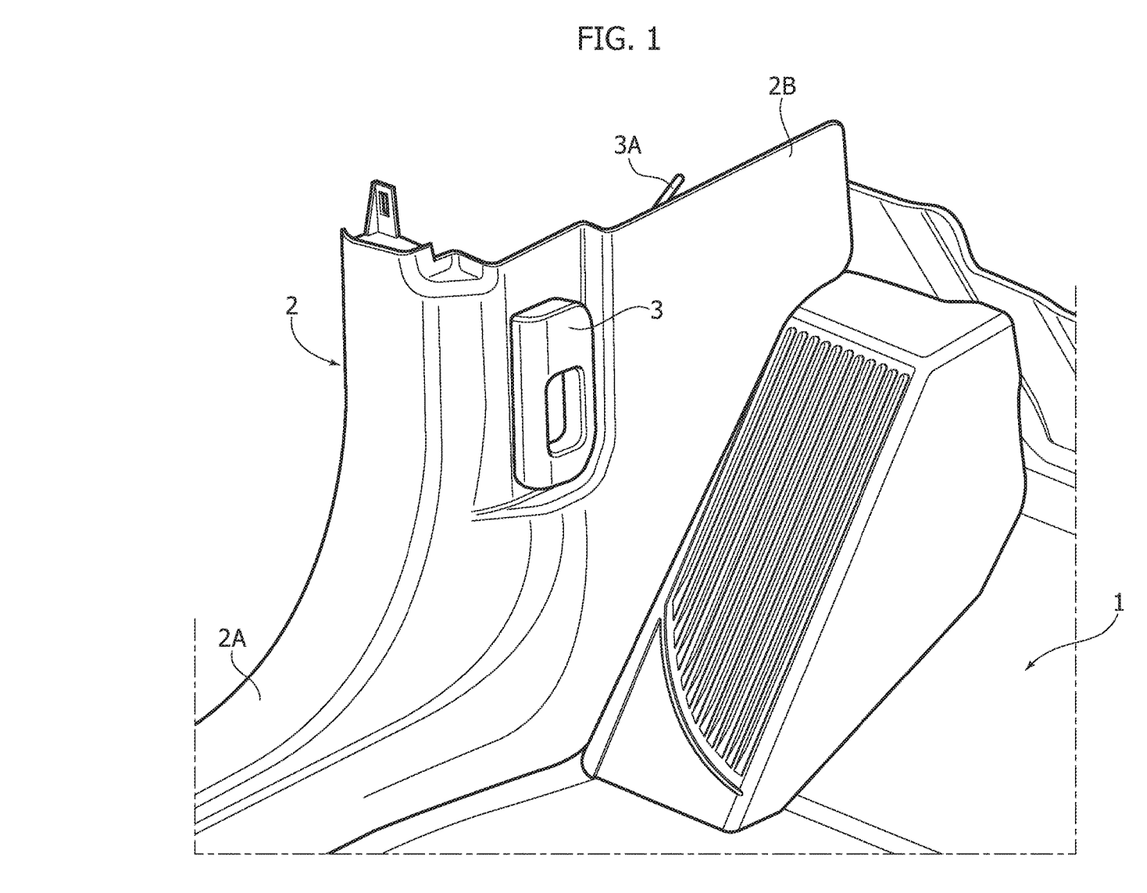
FIG. 1 is a partial perspective view of the floor and the side wall of a driving side of a motor vehicle, provided with the foot-rest structure according to the invention.
Figure 2:
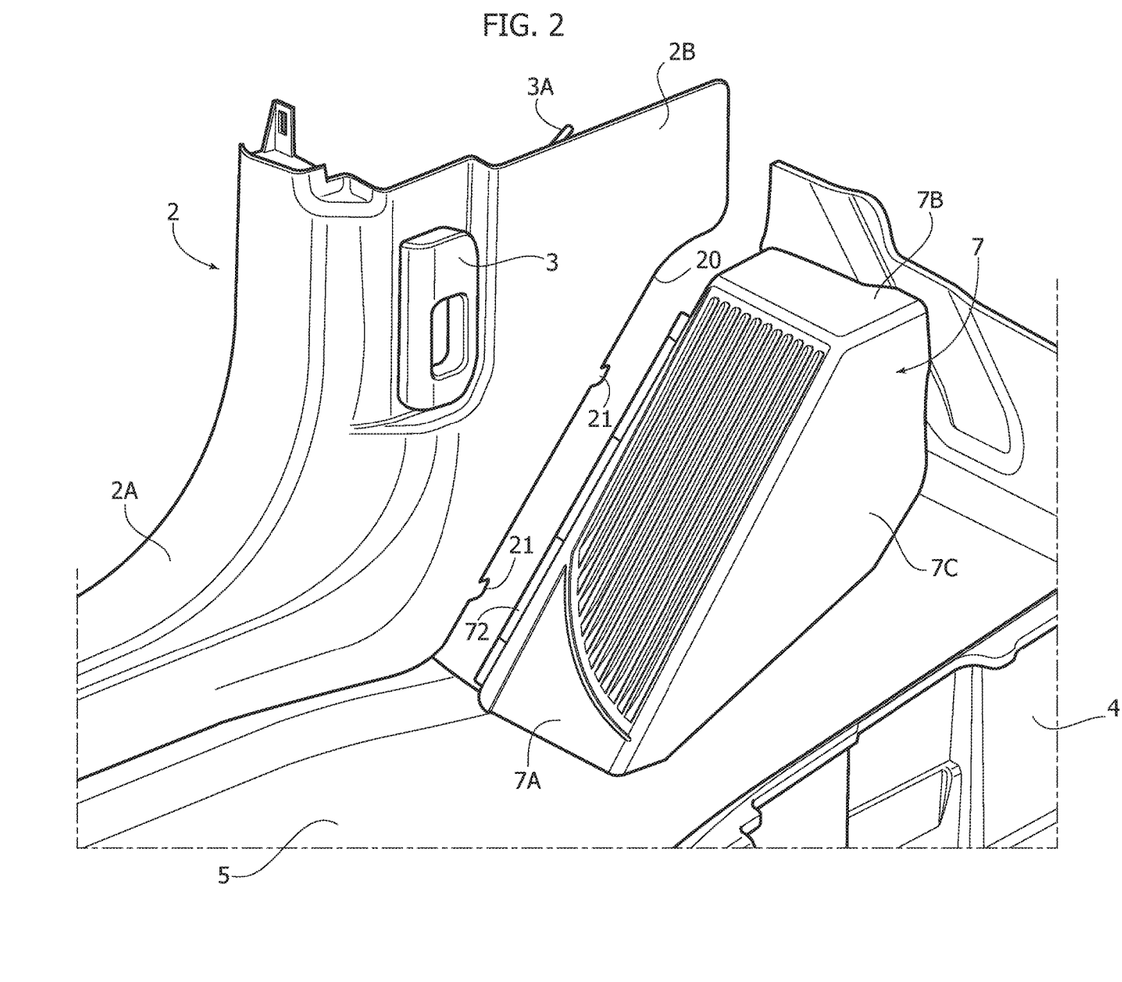
FIG. 2 is a partially exploded view of the structure of FIG. 1.
Figure 3:
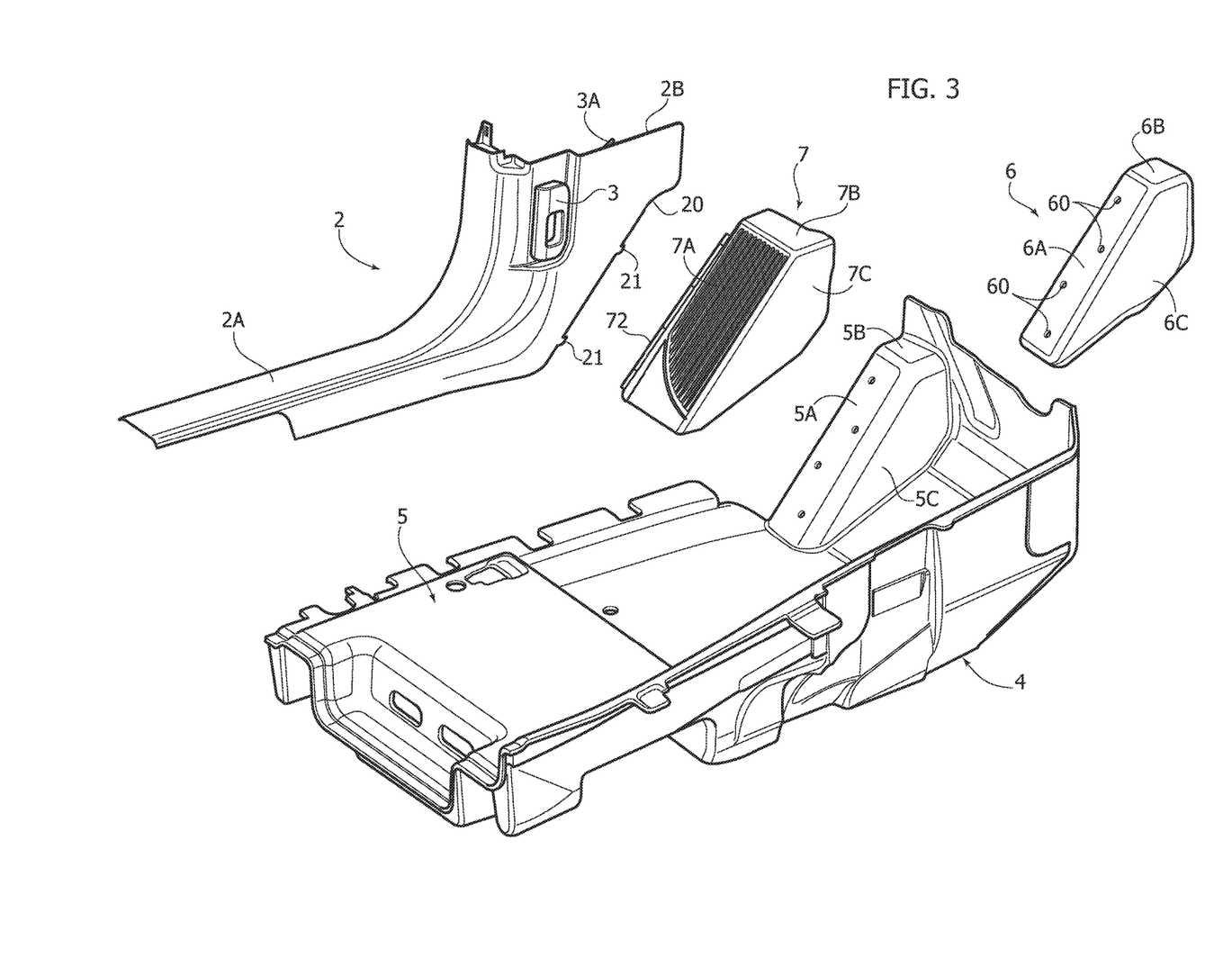
FIG. 3 is a further exploded perspective view of the structure of FIGS. 1 and 2.
Figure 4:
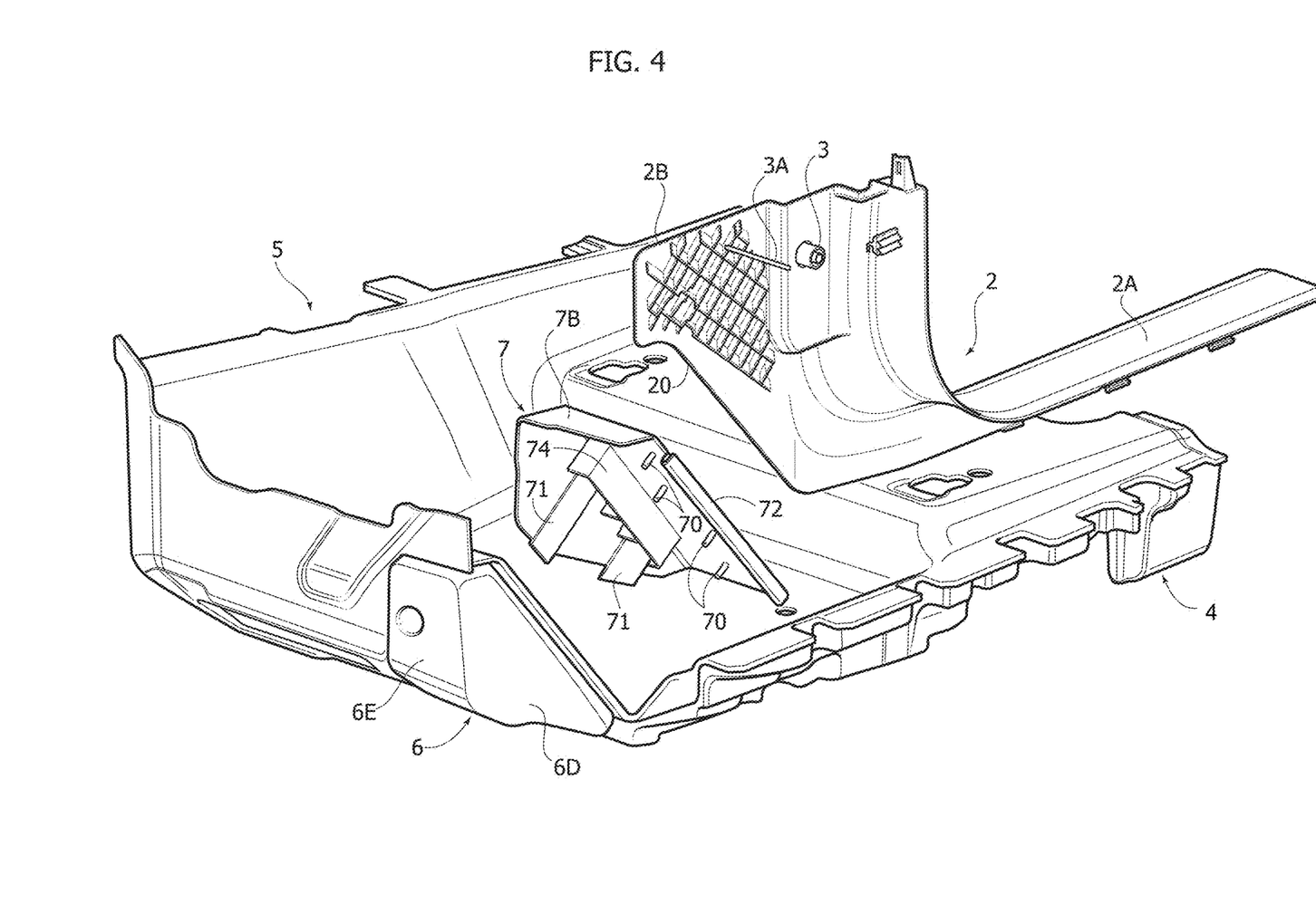
FIG. 4 is a further exploded perspective view of the structure of FIGS. 1 to 3, in a view from the front.
Figure 5:
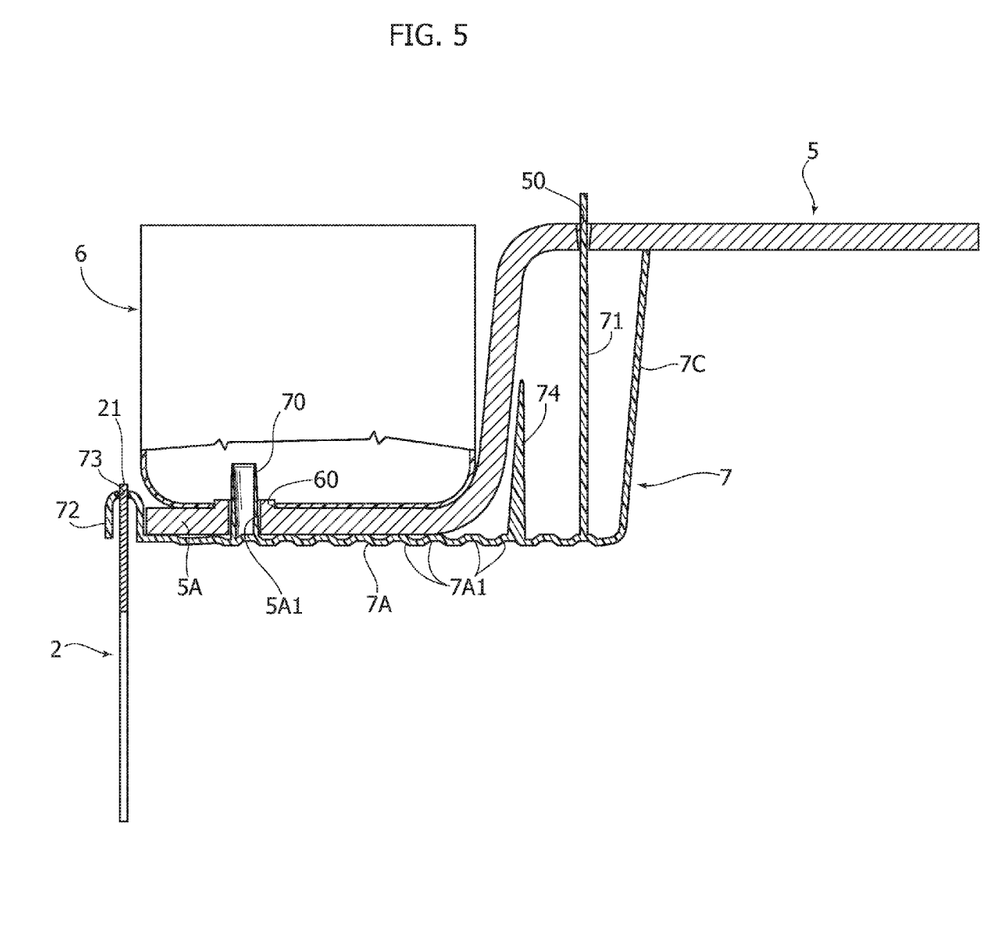
FIG. 5 is a cross-sectional view at an enlarged scale of the structure of FIGS. 1 to 4.
Figure 6:
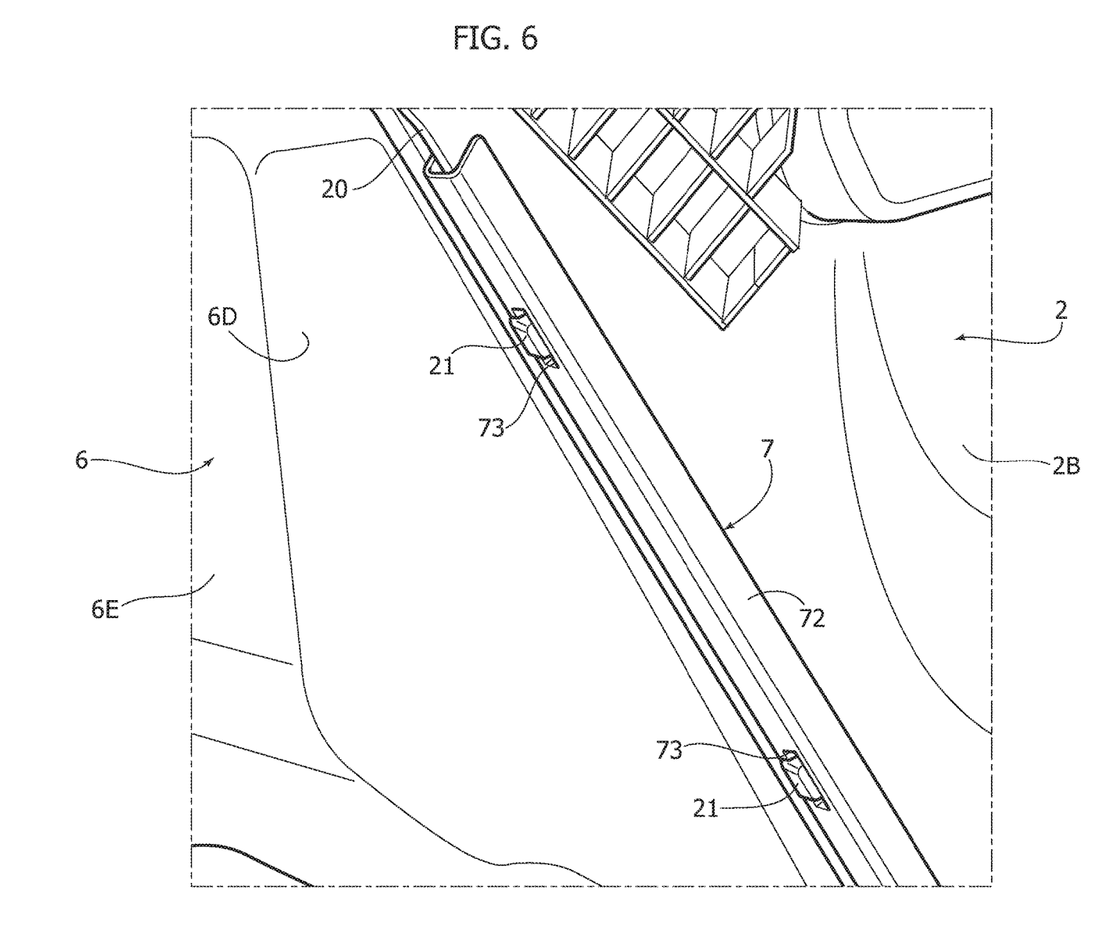
FIG. 6 shows a detail of FIG. 4 in an assembled condition and at an enlarged scale.

Further characteristics and advantages of the present invention will now be described with reference to the annexed drawings, which are provided purely by way of non-limiting example and in which:

FIG. 1 is a partial perspective view of the floor and of the side wall of a driving side of a motor vehicle, provided with the foot-rest structure according to the invention;

FIG. 2 is a partially exploded view of the structure of FIG. 1;

FIG. 3 is a further exploded perspective view of the structure of FIGS. 1 and 2;

FIG. 4 is a further exploded perspective view of the structure of FIGS. 1 to 3, in a view from the front;

FIG. 5 is a cross-sectional view at an enlarged scale of the structure of FIGS. 1 to 4; and FIG. 6 shows a detail of FIG. 4 in an assembled condition and at an enlarged scale.

With reference to the drawings, number 1 designates as a whole a portion of the driving side of the floor of a motor vehicle adjacent to a lateral trim panel 2 that covers, on the side facing the passenger compartment of the motor vehicle, the bottom portion of the side of the motor vehicle.

The lateral trim panel 2 has a rear portion 2A, which defines the bottom edge of the door compartment, and a front portion 2B constituting a substantially vertical wall that defines the lateral surface of the passenger compartment underneath the dashboard (not illustrated) of the motor vehicle.

Also visible in the example illustrated in FIG. 1 is a handle 3 arranged in a recess of the vertical wall 2B and connected to a flexible metal cable 3A (partially visible in FIG. 1) that is designed to govern release of the lock of the bonnet of the motor vehicle.

With reference in particular to FIGS. 3 and 4, here number 4 designates the structure of sheet metal constituting the floor panel of the motor vehicle, mounted on which is a mat structure 5 of the type conventionally used for covering the floor of passenger compartments of motor vehicles. The mat 5 has a portion 5A that is arranged between a foot-rest support 6 and a covering element 7. The foot-rest support 6 has a three-dimensional body made of plastic material, mounted on the floor panel 4 and secured thereto via any connection means (for example, screws). The body of the support 6 has an inclined front surface 6A and at least a top surface 6B and a lateral surface 6C, which faces the inside of the passenger compartment of the motor vehicle. As may be seen in FIG. 4, in the case of the example illustrated, the body made of plastic material 6 also has a lateral surface 6D facing the outside and a rear surface 6E.

As already mentioned, mounted on the foot-rest support 6 is a covering element 7. As likewise has already been mentioned, in the case of the specific embodiment illustrated herein, moreover arranged between the support 6 and the covering element 7 is the portion 5A of the mat 5.

The covering element 7 has a body made of plastic material, which, as may be seen in FIGS. 3 and 4, includes an inclined front wall 7A arranged over the inclined front surface 6A of the foot-rest support 6. The body of the covering element 7 moreover includes a top wall 7B arranged on the top surface 6B of the support 6, and just one side wall 7C, on the side facing the inside of the passenger compartment, arranged over the inner side wall 6C of the support 6. The element 7 only includes the front wall 7A, the top wall 7B, and the inner side wall 7C and is instead open on its outer side, on its rear side, and on its bottom side.

The front wall 7A has a surface preferably formed with parallel vertical ribbings 7A1 (see FIG. 5) for the driver to rest his or her left foot thereon.

Of course, the present description may be applied identically also to a right-hand driving side, in which case the foot-rest structure will be on the right side, adjacent to a lateral trim panel arranged on the right side of the passenger compartment.

Projecting from the rear surface of the front wall 7A of the covering element 7 are engagement elements 70 that traverse openings 5A1 formed in the mat portion 5A and engage corresponding coupling seats 60 prearranged in the foot-rest support 6 for rigid connection of the covering element 7 on the support 6.

As may be seen in FIG. 5, the wall 7A extends laterally towards the inside of the passenger compartment beyond the foot-rest support 6 and has its side wall 7C directly resting on the floor 5. Projecting from the wall 7A are also tabs 71 that engage openings 50 in the structure of the mat 5.

As may be seen clearly in FIG. 6, the inclined front wall 7A of the covering element 7 has its side edge facing the side panel 2 that forms a channel 72, within which the front edge 20 of the lateral trim panel 2 is received.

In the example illustrated, the front edge 20 of the lateral trim panel 2 has engagement teeth 21, which that cooperate with respective engagement seats 73 formed in the bottom of the channel 72 for mutual connection between the front edge 20 of the lateral trim panel 2 and the covering element 7.

As may be seen in FIG. 3, the mat portion 5A also has a front wall arranged over the surface 6A, a top wall 5B arranged over the surface 6B, and an inner side wall 5C arranged over the surface 6C.

Assembly of the structure described above may be carried out with simple, easy, and fast operations. The foot-rest support 6 is fastened to the floor panel 4 and is then covered by the portion 5A of the mat structure 5 when this is applied on the floor panel. The covering element 7 is then mounted on the support 6, with interposition of the portion 5A of the mat structure 5, by coupling the covering element 7 to the support 6 by engagement of the elements 70 within the seats 60 and engagement of the tabs 71 within the openings 50 of the mat structure 5 (see FIG. 5). This operation may be carried out in an extremely simple and intuitive way in so far as the covering element 7 has an internal tab 74 that can be used as reference for positioning against the side wall 6C of the support 6, with interposition of the wall 5C of the mat 5. In the assembly process, it is moreover possible to count on the reference determined by cooperation between the top wall 7B of the covering element and the top surface 6B of the support 6 and between the inclined front wall 7A of the covering element and the inclined front surface 6A of the support 6. Once the covering element has been properly positioned, it merely has to be pressed into the final position so as to obtain mutual engagement between the engagement elements 60 and 71 and the respective seats 60, 50. Once the covering element 7 has been mounted, the front edge 20 of the lateral trim panel 2 can be connected thereto. For this purpose, it is simply necessary to position the front edge 20 of the panel 2 within the channel 72, bringing the teeth 21 into engagement within the respective seats 73. The front edge 20 of the lateral trim panel 2 only needs to engage the channel 72 of the covering element 7, without any direct engagement to the support 6, so that this operation can be carried out easily and quickly.

The simplicity of the operation of assembly also constitutes a greater guarantee on the fact that it is always carried out properly thus ensuring a stable and reliable connection of the various parts to one another.

Of course, without prejudice to the principle of the invention, the details of construction and the embodiments may vary widely with respect to what has been described and illustrated herein purely by way of example, without thereby departing from the scope of the present invention.

What is claimed is:

1. A foot-rest structure for a driving side of a floor of a motor-vehicle, comprising:
   a foot-rest support, secured to a floor panel of the motor-vehicle, a covering element mounted on said foot-rest support, a trim lateral panel having a front edge connected to said covering element, wherein said foot-rest support is constituted by a three-dimensional body of plastic material, defining a three-dimensional volume projecting from the floor panel, adjacent to said trim lateral panel, and having a front inclined surface, an upper surface and at least one inner lateral surface facing towards the inside of a passenger compartment of the motor-vehicle, said covering element is constituted by a body of plastic material arranged over said foot-rest support, and having:

a front inclined wall covering said front inclined surface of the foot-rest support and defining a foot resting surface, an upper wall and a lateral wall respectively arranged over said upper surface and said at least one inner lateral surface of said foot-rest support, said covering element and said foot-rest support being provided with engagement elements and seats cooperating with said engagement elements, for mutual rigid connection of the covering element and the foot-rest support, the front edge of the trim lateral panel is connected only to said covering element, with no direct connections to said foot-rest support, said covering element having said front inclined wall which, on a lateral edge thereof faces the trim lateral panel, and said covering element having a channel in which the front edge of the trim lateral panel is received, said front edge of the trim lateral panel and said channel having engagement elements and seats cooperating with said engagement elements, for rigidly connecting the trim lateral panel to said covering element.

2. The foot-rest structure according to claim 1, wherein between said foot-rest support and said covering element a portion of a mat structure is interposed, which is mounted on the floor panel of the motor-vehicle.

3. The foot-rest structure according to claim 1, wherein said foot-rest support also comprises an outer lateral surface and a rear surface.

4. The foot-rest structure according to claim 1, wherein said covering element includes only said front inclined wall, said upper wall and said lateral wall and is open on an outer side, on a rear side and on a lower side of the covering element.

5. The foot-rest structure according to claim 2, wherein said covering element's front inclined wall projects laterally towards the inside of the motor-vehicle, beyond said foot-rest support, and said lateral wall rests on said mat structure.

6. The foot-rest structure according to claim 5, wherein from a portion of the front inclined wall which projects laterally beyond said foot-rest support there extends one or more inner tabs which engage respective openings formed in said mat structure.

7. The foot-rest structure according to claim 6, wherein from said portion of the front inclined surface there extends an inner tab adapted to be arranged adjacent to the inner lateral surface of the foot-rest support.

* * * * *